March 21, 1950 W. W. SLOANE 2,500,962
DRIVE MECHANISM FOR INERTIA PROPELLING DEVICES
Filed March 9, 1946 7 Sheets-Sheet 1

Fig. 1

Inventor
William W. Sloane
Clarence F. Poole
Attorney

March 21, 1950   W. W. SLOANE   2,500,962
DRIVE MECHANISM FOR INERTIA PROPELLING DEVICES
Filed March 9, 1946   7 Sheets-Sheet 4

Inventor
William W. Sloane
Clarence J. Poole
Attorney

Fig. 8

Inventor
William W. Sloane
Clarence F. Poole
Attorney

March 21, 1950 W. W. SLOANE 2,500,962
DRIVE MECHANISM FOR INERTIA PROPELLING DEVICES
Filed March 9, 1946 7 Sheets-Sheet 6

Inventor
William W. Sloane
Clarence F. Poole
Attorney

Patented Mar. 21, 1950

2,500,962

UNITED STATES PATENT OFFICE 2,500,962

DRIVE MECHANISM FOR INERTIA PROPELLING DEVICES

William W. Sloane, Chicago, Ill., assignor to Goodman Manufacturing Company, Chicago, Ill., a corporation of Illinois Application March 9, 1946, Serial No. 653,398

5 Claims. (Cl. 180—8)

1

This invention relates to improvements in inertia propelling devices.

The principal objects of my invention are to provide a new and improved form of drive for an inertia propelling device including a novel form of drive connection to a reciprocating inertia propelling mechanism, which is so arranged as to modify speed variations and load fluctuations in the propelling mechanism, and to prevent backlash in the drive gearing for the propelling mechanism during the entire cycle of operation thereof.

Another object of my invention is to provide a novel form of drive for a reciprocating drive mechanism, which drive includes drive gearing and a torsion spring for driving said gearing, which spring is so proportioned as to have a range which is never below the driving speed of the drive motor for the drive mechanism for a long enough period to let it become free, so the spring may take up backlash of the drive gears therefor and modify fluctuations in speed and load of the reciprocating drive mechanism.

A prior Patent No. 2,355,534, which issued to J. H. Holstein on August 8, 1944, shows a shaker conveyor loading device having a reciprocating shovel which is fed into and away from the coal face by an inertia propelling mechanism which operates on principles somewhat similar to those of my present invention. My present invention, however, differs from that shown in the aforementioned Holstein patent in that the inertia propelling mechanism has a simplified form of linkage arrangement, and fluctuations in speed and load on the drive mechanism and backlash in the gears are taken care of in the drive to the propelling mechanism.

These and other objects of my invention will appear from time to time as the following specification proceeds and with reference to the accompanying drawings wherein:

Figure 4 is a view in side elevation of the device shown in Figure 1, drawn to a smaller scale

2 than Figure 2, showing the reciprocating conveyor trough, and showing certain parts thereof and of the drive and support therefor in substantially longitudinal section;

Figure 5 is an enlarged detail view in side elevation with certain parts broken away and certain other parts shown in substantially longitudinal section in order to show certain details of the counterbalancing mechanism for the reciprocating conveyor trough;

Figure 6 is an enlarged fragmentary sectional view taken substantially along line 6—6 of Figure 5;

Figure 7 is an enlarged fragmentary transverse sectional view taken substantially along line 7—7 of Figure 4;

Figure 1:
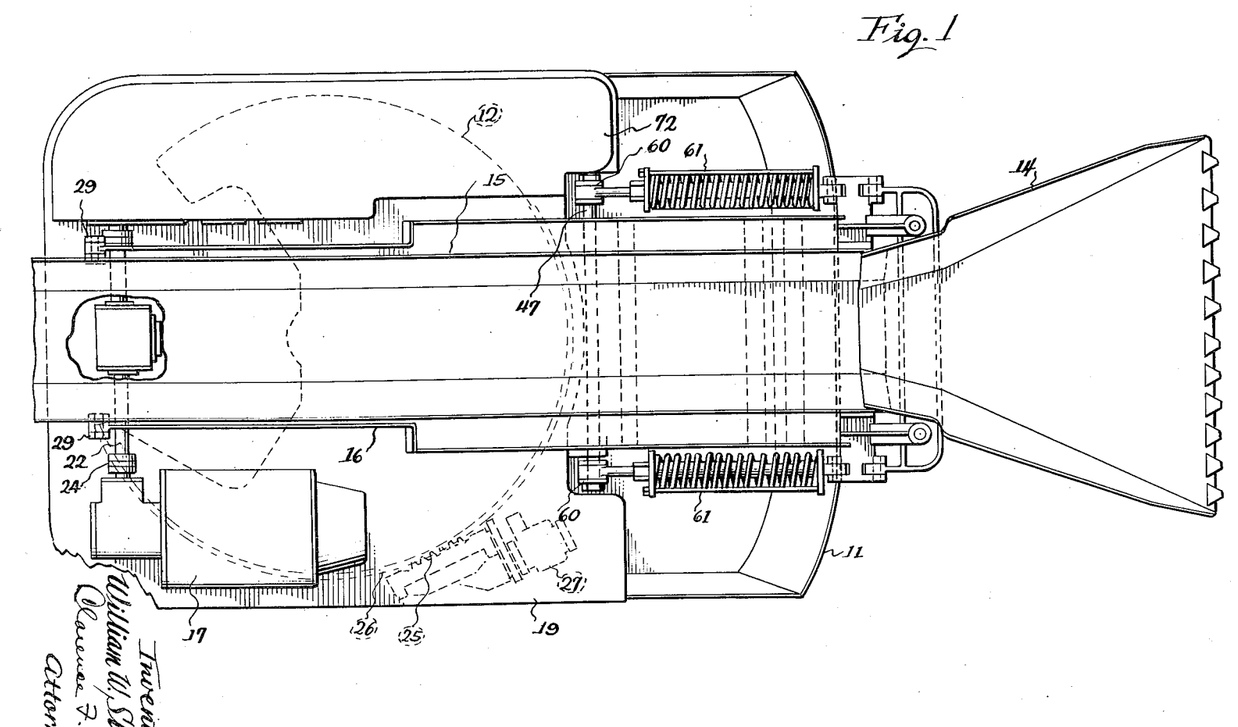
Figure 1 is a plan view of a shaker loading device having an inertia propelling device constructed in accordance with my invention embodied therein.
Figure 2:
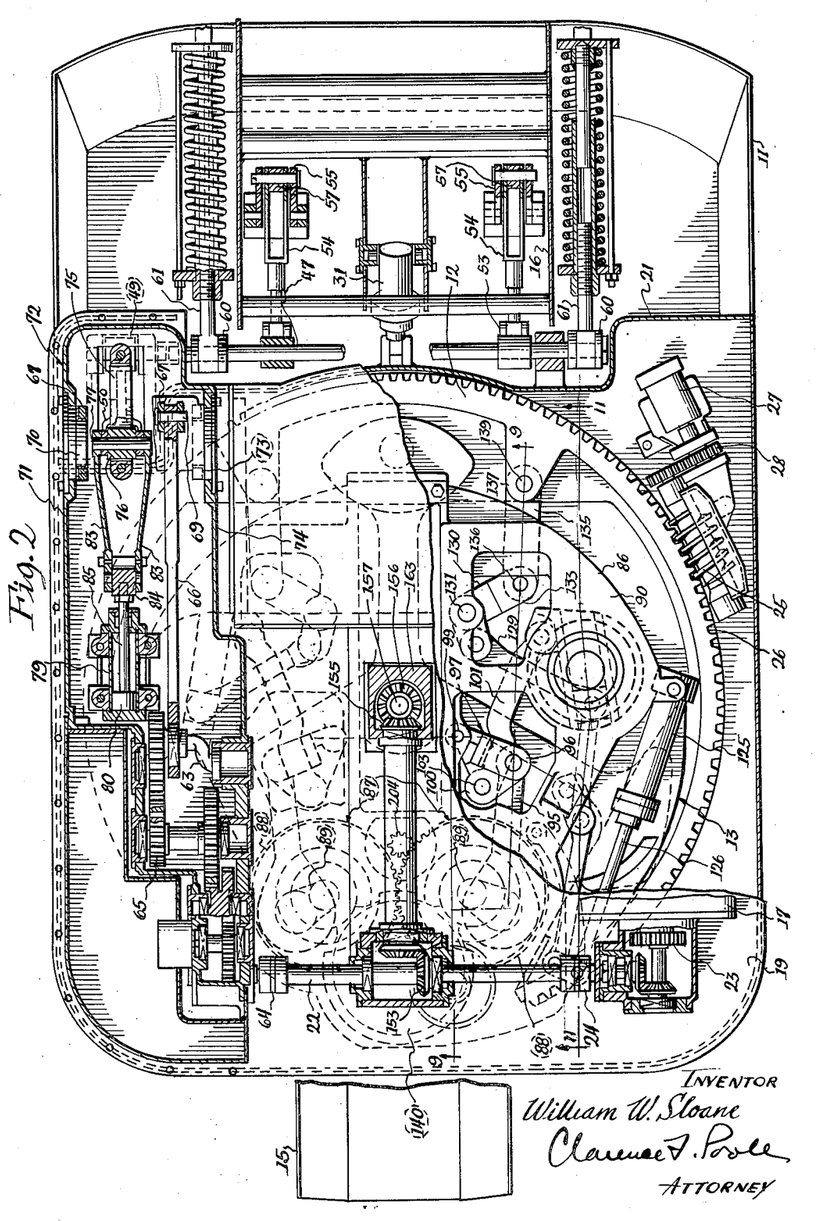
Figure 2 is an enlarged fragmentary plan view of the loading device shown in Figure 1, with certain parts broken away and certain other parts shown in substantially horizontal section.

In Figures 1 and 2 of the drawings a shaker loading device is shown as being mounted on a base 11, slidably movable along the ground on its bottom and having a turntable 12 mounted thereon, with an inertia propelling device 13 guided for reciprocable slidable movement along said turntable and adapted to impart an impelling force thereto which may be directed in various desired directions and at various intensities, for moving said base along the ground and for feeding a shovel 14 on the forward end of a reciprocating trough 15 into the material it is desired to load.

A motor 17 mounted on said base provides a source of power to reciprocably drive said trough and to reciprocably move said inertia propelling device along said turntable. Said motor, as herein shown, is mounted on the top of a cover 19 extending over said turntable and inertia propelling device. Said motor extends longitudinally along one side of said base and is operatively connected with a transverse shaft 22 through a spur and bevel gear reduction, generally indicated by reference character 23, and a flexible coupling 24. Said transverse shaft forms a drive means for said reciprocating trough and said inertia propelling device as will hereinafter more clearly appear as this specification proceeds.

The turntable 12 is turned about a vertical axis to position the inertia propelling device 13 to direct an impelling force at various angles with respect to the longitudinal center line of the base 11, to cause said base to move in an angular direction to the right or left by means of a worm 25 meshing with worm gear teeth 26 formed on the outer periphery of said turntable. Said worm is of a self-locking type, to hold said turntable in the desired position and is driven from a motor 27, herein shown as being a fluid motor, through a gear train indicated generally by reference character 28.

Figures 4, 5, 6, 7:
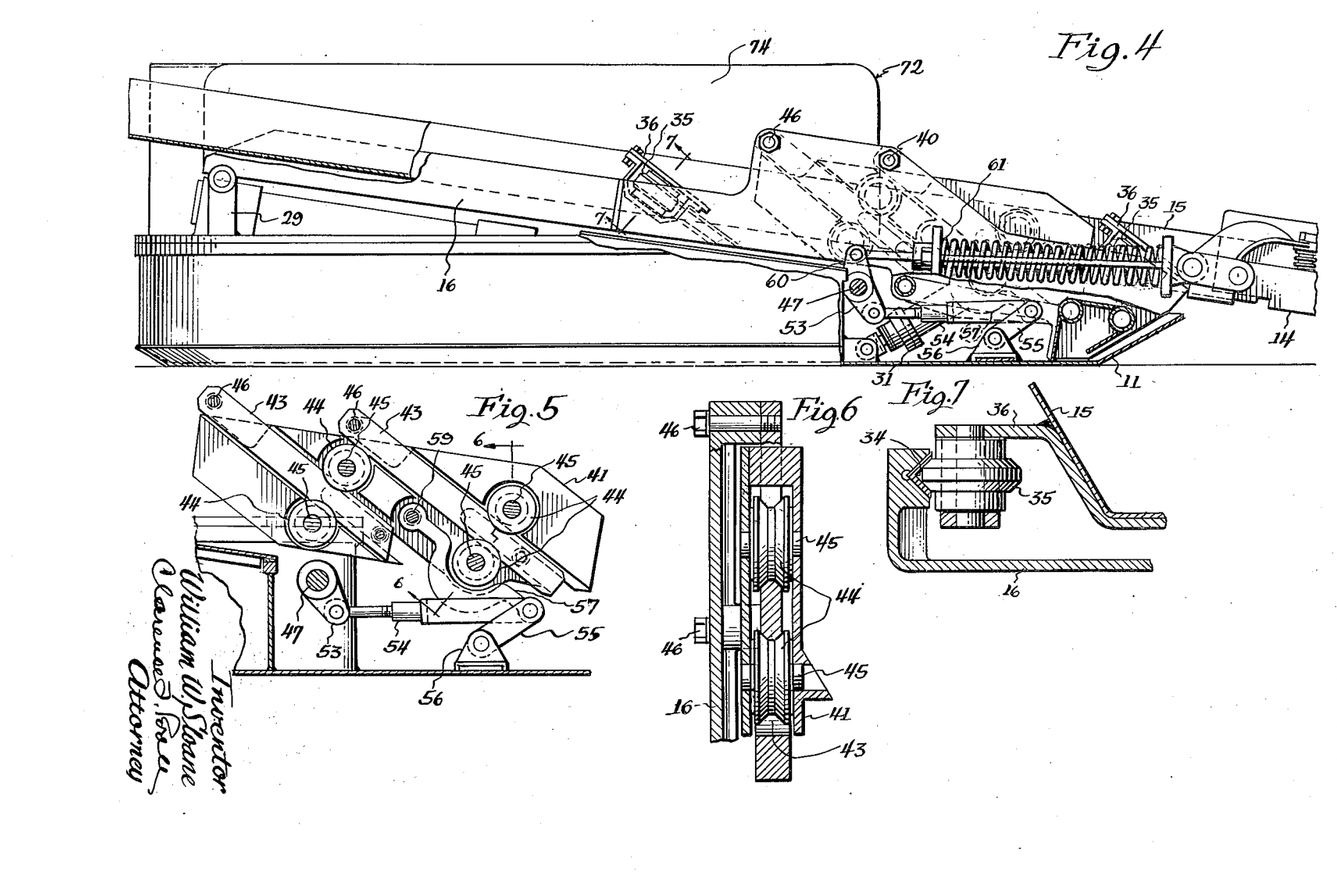

The reciprocating trough 15 is mounted on the base 11 on a frame 16, extending along opposite sides of said reciprocating trough and transversely pivoted at its rear end to a pair of laterally spaced upright supports 29, 29 (see Figure 4). A cylinder and piston 31 transversely pivoted to said base and to a forward portion of said frame may pivot said frame and trough and the shovel 14 about the axis of connection of said frame to said supports, to vertically adjust the position of said shovel.

The mounting for the reciprocating trough 15 on the frame 16 includes a pair of longitudinally spaced upwardly inclined V-shaped recessed guide tracks 34, 34 mounted on the inner side of said frame. Said guide tracks are adapted to be engaged by rollers 35, 35 having V-shaped engaging faces and rotatably mounted in inclined brackets 36, 36, projecting laterally from opposite sides of the reciprocating trough 15 (see Figures 4 and 7).

A counterweight 41 is provided on each side of said trough to neutralize the tendency of the shaking action of the trough 15 and shovel 14 to move the base 11 along the ground. Each of said counterweights is herein shown as being mounted on the inside of the frame 16, to move in the same angular direction as the reciprocating trough 15, but in opposite phase relationship with respect thereto. Each of said counterweights is mounted on a pair of parallel longitudinally spaced inclined guide tracks 43, 43 on parallel spaced supporting rollers 44, 44 engaging opposite sides of said guide tracks and journaled in said counterweight on transverse shafts 45, 45. Said guide tracks are spaced inwardly of said frame and are secured thereto by cap screws 46, 46 (see Figure 6).

Figure 3:
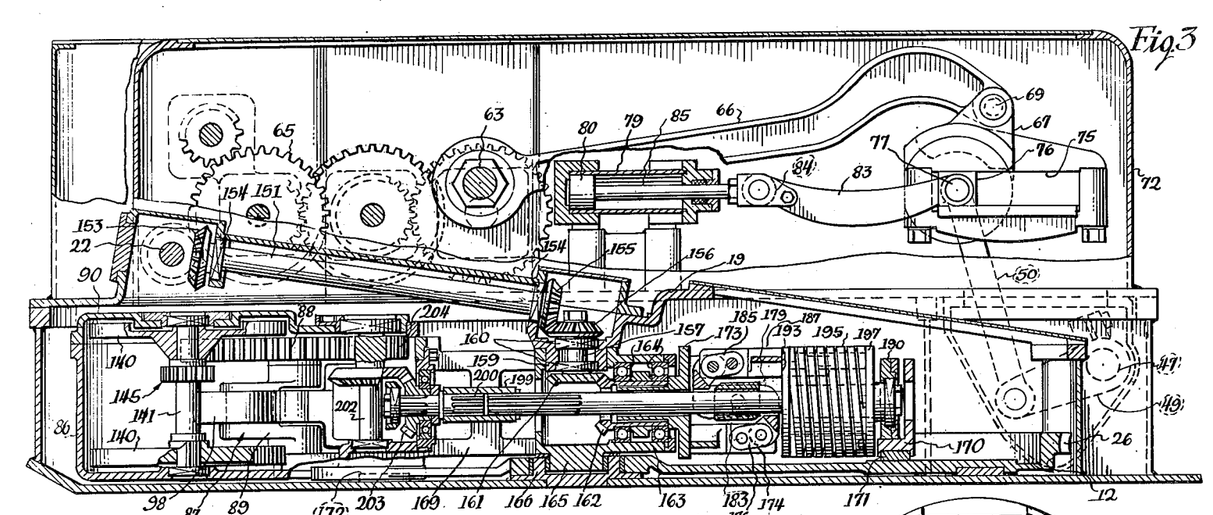
Figure 3 is a view in side elevation of the loading device shown in Figure 1, with certain parts broken away and certain other parts shown in substantially longitudinal section.

The reciprocating trough 15 and counterweight 41 are driven in opposite phase relation with respect to each other through a transversely extending rock shaft 47 journaled in suitable bearing supports provided on the base 11 and rocked by a rocking arm 49 secured to one end of said shaft and having a pair of laterally spaced links 50, 50 connected to its free end (see Figures 2 and 3). Said links extend upwardly from said rocking arm and are connected with a shaker conveyor drive mechanism, generally indicated by reference character 51, in a manner which will hereinafter more clearly appear as this specification proceeds.

A pair of laterally spaced depending rocking arms 53, 53 are secured to the rock shaft 47 and have driving connection with the counterweights 41, 41 through links 54, 54 pivotally connected to said rocking arms at one of their ends and pivotally connected to rocking arms 55, 55 at their opposite ends (see Figure 5). Said last mentioned rocking arms are pivoted on the base 11 on upright support brackets 56, 56. Said links have bifurcated forward ends, and each has a drive link 57 connected thereto, between the furcations thereof. Said drive links extend upwardly along and are pivotally connected to the counterweights 41, 41, intermediate their ends, by means of pivotal pins 59, 59.

The rock shaft 47 also has a pair of laterally spaced upwardly extending rocking arms 60, 60 secured thereto and having driving connection with the reciprocating trough 15 through yieldable links 61, 61 (see Figures 2 and 4). Said yieldable links are so constructed that they normally act as solid members and are only adapted to yield when the forward end of the shovel 14 engages a solid obstruction, so as to prevent damage to said shovel and the drive mechanism therefor, as has been described in the aforementioned Patent No. 2,355,534.

The mechanism for reciprocably driving the rocking arm 49 and the trough 15 in such a manner as to cause material to move upwardly therealong, includes a crank 63 rotatably driven from the end of the shaft 22 opposite from the gear reduction 23 through a flexible coupling 64 and a gear train generally indicated by reference character 65 (see Figures 2 and 3). A link 66 is journaled on said crank and extends forwardly therefrom and is pivotally connected to the upper end of a rocking member 67 through a pivotal pin 69. Said rocking member is transversely journaled adjacent one of its ends on a bearing boss 70 projecting inwardly from an outer side wall 71 of a casing 72 for said drive mechanism and on a laterally spaced bearing boss 73 extending inwardly from an inner side wall 74 of said casing.

The rocking member 67 is provided with a guide slot 75 extending longitudinally therealong, which has a stroke control block 76 slidably mounted therein. A pivotal pin 77 mounted in said block, extends outwardly beyond opposite sides thereof and has the links 50, 50 pivotally mounted thereon and depending therefrom along opposite sides of said block and pivotally connected at their lower ends to the rocking arm 49.

A stroke controlling fluid pressure cylinder 79 having a piston 80 movable therein, is provided to move said block along the slot 75 to vary the stroke of the rocking arm 49 and the reciprocating trough 15 and thus vary the intensity of the conveying action of said trough, and to hold said block in the desired position along said slot. The connection between said cylinder and piston to said block includes a pair of parallel spaced links 83, 83 pivotally connected to a block 84 on the end of a piston rod 85, extending from said piston (see Figure 2). The ends of said links opposite from said block are pivotally connected to opposite ends of the pivotal pin 77.

When the pivotal pin 77 is in the position shown in Figures 2 and 3, the pivotal axis of said pin will be coaxial with the pivotal axis of the rocking member 67 and there will be no vertical movement of the links 50, 50. As said block 76 is moved forwardly along the slot 75 by the admission of fluid under pressure to the head end of the cylinder 79, the arc of movement of said block will increase, which will increase the stroke of the rocking arm 49 and trough 15 with a resultant increase in the conveying effect imparted to said trough.

Referring now to the inertia propelling device 13 and the means for reciprocably moving said device along the turntable 12, said propelling device consists generally of a reciprocably driven propelling weight which has its own drive mechanism moving bodily therewith so as to add to its mass as an effective inertia propelling weight in the manner clearly shown and described in the aforementioned Patent No. 2,355,534.

As herein shown, the inertia propelling device 13 includes a frame and bearing support 86 slidably guided on said turntable for reciprocable movement along fixed guide means at the center of said turntable, as will hereinafter more clearly appear. Said frame forms a bearing support means for two reciprocating drive mechanisms indicated generally by reference characters 87, 87. Said drive mechanisms include two meshing spur gears 88, 88 herein shown as being mounted on crank shafts 89, 89, adjacent the upper ends thereof. Each of said crank shafts is journaled at its upper end in a top cover 90 for the frame 86 on a ball bearing 91, and is journaled at its lower end in the bottom of said frame on a ball bearing 92. Said drive mechanisms are each of a similar construction, so one only need herein be described in detail and the same part numbers will be applied to each of said drive mechanisms.

A link 95 is journaled on the crank of the crank shaft 89 at one of its ends. The opposite end of said link is bifurcated and the furcations thereof are pivotally connected to a pair of vertically spaced arms 96, 96 of a bell crank 97 by means of pivotal pins 98, 98 (see Figure 9). Said bell crank is mounted on a pivotal pin 99, mounted at its opposite ends in the bottom and the cover of the frame 86. Another rocking arm 100 of said bell crank 97 is spaced intermediate the arms 96, 96. Said arm 100 is bifurcated and has a link 101 pivotally mounted thereon between the furcations thereof, on a vertical pin 103. Said link extends between the arms 96, 96 and the furcations of the link 95, and is pivotally connected at its free end to an ear 104 extending from a rocking member 105, for rocking said rocking member (see Figure 8).

Figure 12:
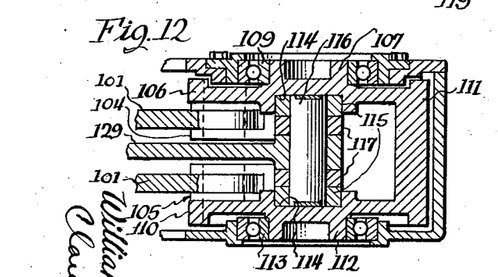
Figure 12 is a detail transverse sectional view taken substantially along line 12—12 of Figure 8.

The rocking member 105 has an upper portion 106 having an upwardly extending boss 107 journaled in the cover 90 of the frame 86 on a ball bearing 109, and has a downwardly spaced lower portion 110 connected to said upper portion by a wall 111 extending partially around said rocking member (see Figure 12). Said lower portion has a depending bearing boss 112 mounted in the bottom of the frame 86 on a ball bearing 113.

Figure 8:
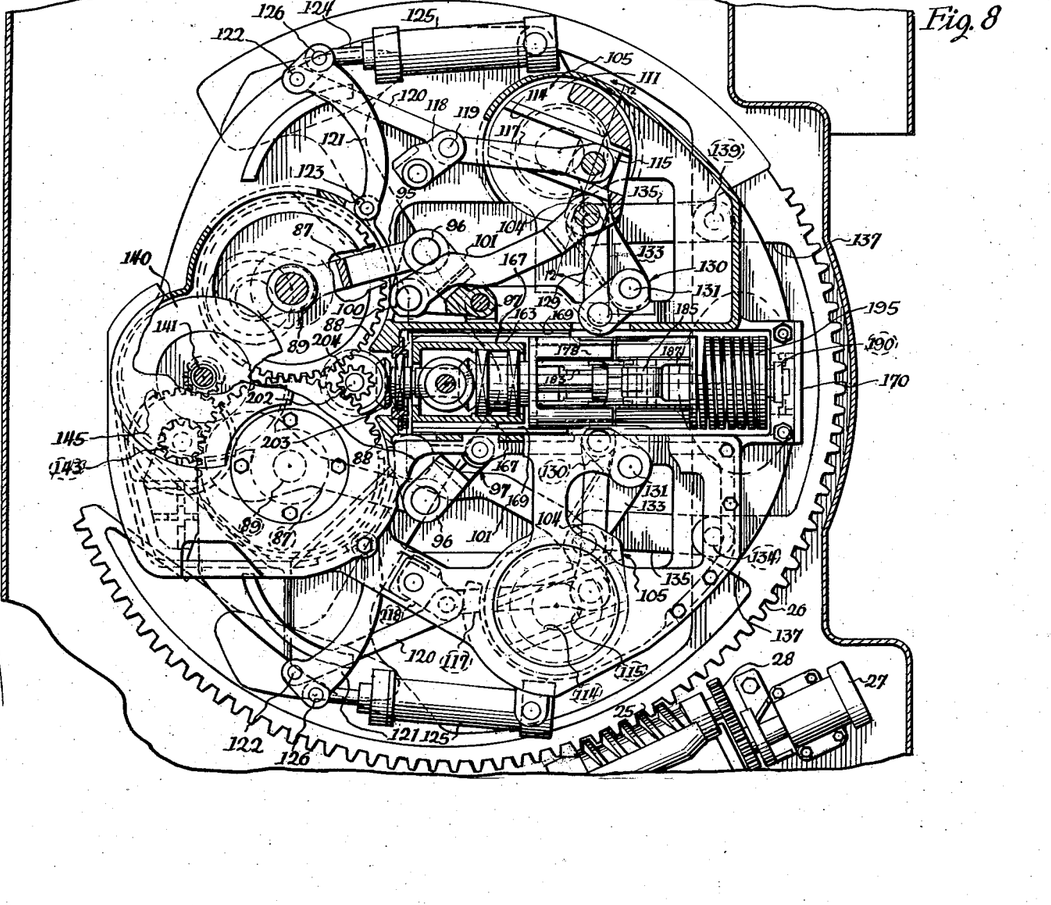
Figure 8 is an enlarged detail fragmentary plan view of the device, with certain parts broken away and certain other parts shown in horizontal section in order to show certain details of the drive mechanism for the inertia propelling device.
Figure 9:
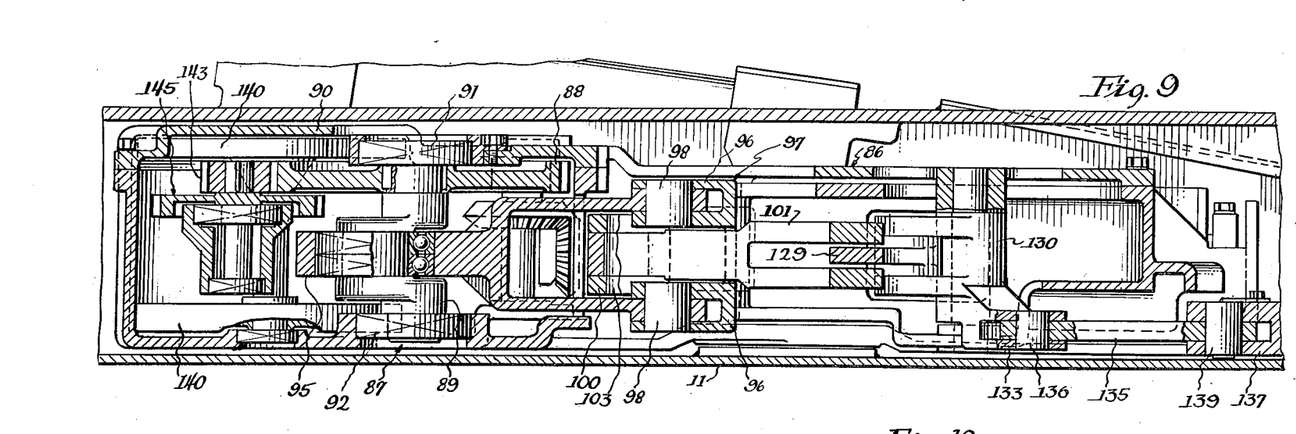
Figure 9 is an enlarged fragmentary longitudinal sectional view taken substantially along line 9—9 of Figure 2.
Figure 10:
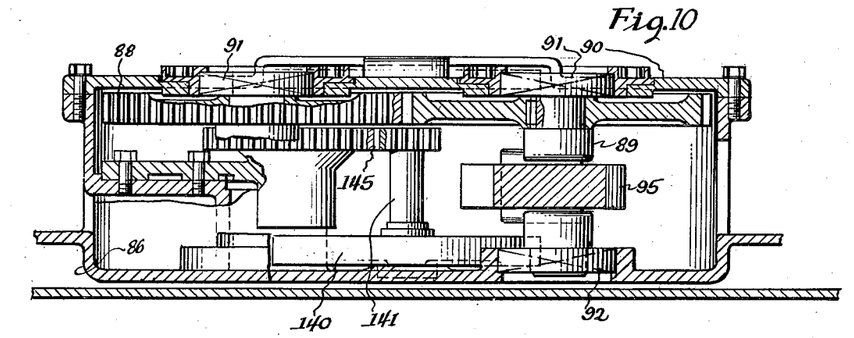
Figure 10 is a transverse sectional view drawn to substantially the same scale as Figure 9 and showing certain details of the drive gearing for the inertia propelling mechanism.
Figure 11:
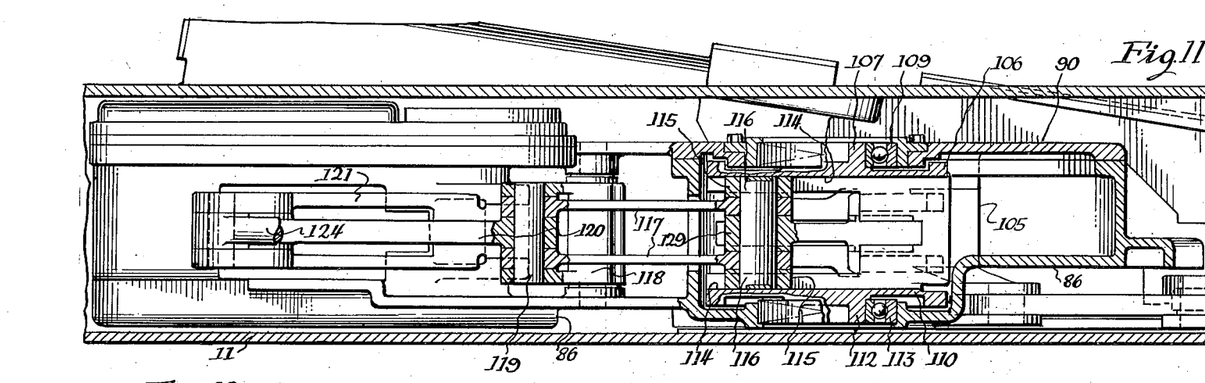
Figure 11 is a fragmentary longitudinal sectional view taken substantially along line 11—11 of Figure 2, and drawn to substantially the same scale as Figure 9.

The insides of the upper and lower portions 106 and 110 of said rocking member 105 are provided with rectilinear guides 114, 114 extending across said rocking member in a generally longitudinal direction. Each of said guides is adapted to have a stroke control block 115 slidably mounted therein. Said blocks are connected together by means of a vertical pivotal pin 116 and are held in the desired position in said guides or moved along said guides, to vary the intensity of the propelling effect of said inertia device or to reverse the propelling effect of said inertia device by means of a pair of vertically spaced parallel links 117, 117. Said pins are pivotally connected to said pivotal pins at one of their ends, just inwardly of said blocks, and are pivotally connected at their opposite ends between the furcations of a rocking member 118 on a pivotal pin 119. A link 120 is also connected to said last mentioned pivotal pin between the links 117, 117. The opposite end of said link 120 extends between the furcations of a bifurcated rocking member 121, and is connected thereto by means of a pivotal pin 122, as is best shown in Figures 8 and 11. The rocking member 121 has a relatively long rocking arm extending inwardly from the link 120, and is pivotally mounted in the frame 86 on a vertical pin 123. A piston rod 124 extensible from a cylinder 125 is pivotally connected to the rocking member 121 at a point spaced outwardly and forwardly from the point of pivotal connection of the link 120 thereto by means of a pivotal pin 126.

Figure 13:
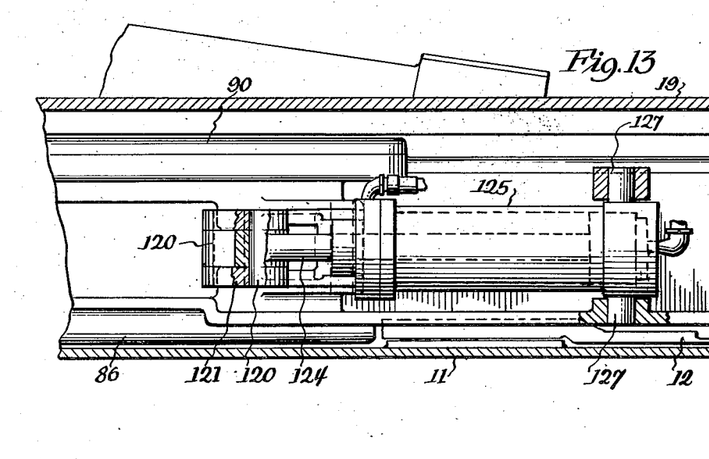
Figure 13 is a fragmentary detail longitudinal sectional view showing certain details of the mechanism for controlling the stroke of the inertia propelling device.

The cylinder 125 is mounted adjacent its head end for movement about a vertical axis in the frame 86, on trunnion pins 127, 127 extending vertically from opposite sides thereof (see Figure 13). The admission of fluid under pressure to one end or the other of said cylinder will thus move the blocks 115, 115 along the guides 114, 114 through the rocking member 121, line 120, rocking member 118, and links 117, 117, to the desired position with respect to said guides, to vary the impelling effect imparted to said base and turntable by the inertia device, and to reverse the direction of the propelling effect, when said blocks are moved from a position to one one side of the pivotal axis of said rocking member 105 to the other side of said pivotal axis, as is described in the aforementioned Patent No. 2,355,534.

The impelling connection from the rocking member 105 to the base 11 includes a link 129 pivotally connected to the pin 116 between the links 117, 117. The free end of said link is pivotally connected between the furcations of one lever arm of a bell crank 130, pivotally mounted in the frame 86 on a vertical pin 131. Said bell crank has a lever arm 133 extending outwardly from the pivotal axis thereof towards the rocking member 105 and extending into an opening formed in the bottom of said frame 86. A link 135 is pivotally connected at one of its ends to said rocking arm, by means of a pivotal pin 136, and is connected at its opposite end between the furcations of a connecting bracket 137 formed integrally with the turntable 12, by means of a pivotal pin 139.

The two drive mechanisms 87, 87 are thus connected to the turntable 12 at spaced apart points so that upon rotation of the cranks 89, 89 and proper positioning of the stroke control blocks 115, 115 to one side or the other of the pivotal axes of the rocking members 105, 105, the bell cranks 130, 130 will be rocked through the links 129, 129, rocking members 105, 105, links 101, 101, bell cranks 97, 97 and links 95, 95 and cranks 89, 89, to reciprocably move the frame 86 and said drive mechanism along the turntable 14 through the connecting links 135, 135 and impart a propelling force thereto. It should here be understood that the stroke control blocks 115, 115 for each drive mechanism may be independently moved along their associated guides 114, 114 to independently control the drive action of each reciprocable drive mechanism and, if desired, impart an impelling force to one side of the turntable 12 in one direction and at the same time impart an impelling force to the opposite side of said turntable in an opposite direction, to turn the entire loading device to one side or the other.

Two coaxial flywheels 140, 140 are mounted on a vertical shaft 141 adjacent the upper and lower ends thereof. Said shaft is journaled in the bottom of the frame 86 and in the cover 90 therefor. Said flywheels serve to carry the linkage mechanisms past dead center positions and help modify speed and load fluctuations of the motor 17 upon operation of the reciprocating drive mechanisms 87, 87. Said shaft and flywheels are driven from a pinion 143 meshing with the gear 88, which is the right-hand gear when looking from the rear to the forward end of the machine, through a gear train generally indicated by reference character 145.

The drive connection from the motor 17 to the spur gears 88, 88 includes a longitudinally extending shaft 151 driven from the shaft 22 through a pair of meshing bevel gears 153, 153 (see Figure 3). Said shaft is inclined downwardly from the shaft 22 as it extends towards the forward end of the base 11, and is journaled in the cover 19 for said base on ball bearings 154, 154, disposed adjacent opposite ends of said shaft. A bevel gear 155 keyed on the forward end of said shaft meshes with and drives a bevel gear 156 keyed on the upper end of a vertical shaft 157, journaled on ball bearings 160, 160 mounted in a bearing support 159 extending inwardly or downwardly from and formed integrally with the cover 19. A downwardly facing bevel gear 161 is keyed on the lower end of the vertical shaft 157 and meshes with and drives a bevel gear 162 journaled on its hub in a hollow guide member 163, on ball bearings 164, 164.

The hollow guide member 163 is journaled on the outer periphery of the bearing support 159, adjacent its upper end, and is provided with a boss 165 depending from its bottom (see Figure 3). Said boss is journaled in a bearing support 166, mounted in and projecting upwardly from the bottom of the base 11 and coaxial with the pivotal axis of the vertical shaft 157. The turntable 12 is journaled on the outer periphery of said bearing support, for movement about an axis coaxial with the axis of turning movement of said guide member. Opposite sides of said guide member are adapted to be engaged by bearing strips 167, 167 extending along opposite inner side walls 169, 169 of the frame 86, to form a guide for said frame during reciprocable movement thereof with respect to said turntable (see Figure 8). A forward end portion 170 of said frame has a bearing member 171 mounted in the bottom thereof which is adapted to slidably engage the top surface of said turntable (see Figure 3). Laterally spaced bearing pads 172, 172 slidably support the rear part of said frame on said turntable.

Figure 14:
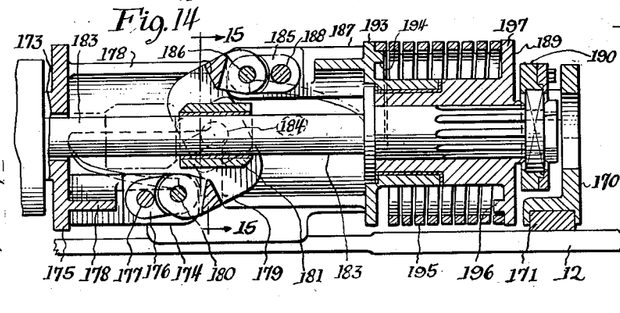
Figure 14 is an enlarged fragmentary longitudinal sectional view taken through the torsion drive means for the inertia propelling device.
Figure 15:
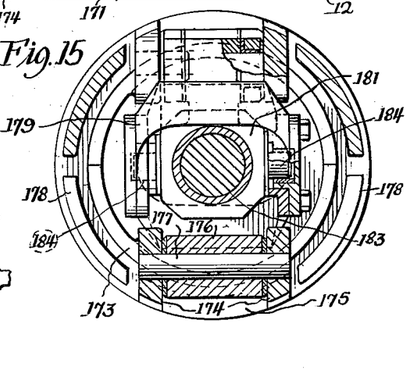
Figure 15 is a transverse sectional view taken substantially along line 15—15 of Figure 14.

A driving member 173 is splined within the hub of the bevel gear 162 and has spaced brackets 174, 174 extending from a flanged portion 175 thereof. A link 176 is mounted between said brackets on a pivotal pin 177 (see Figures 14 and 15). A plurality of semi-cylindrical wall portions 178, 178 extend inwardly from said flanged portion, to form a strengthening means for said driving member. The link 176 is pivotally connected adjacent its forward end to the end of a substantially S-shaped drive link 179 by means of a pivotal pin 180. Said drive link extends along opposite sides of a block 181, encircling but spaced from a longitudinally extending drive shaft 183, and is trunnioned on said block on trunnion pins 184, 184. The opposite end of said drive link has a link 185 pivotally connected thereto by a pivotal pin 186, which link is pivotally connected to a driven member 187 by means of a pivotal pin 188. Said S-shaped drive link, trunnioned on the block 181 intermediate its ends, with the links 176 and 185, forms an extensible drive means for driving the member 187 from the member 173, as said member 187 is reciprocably moved with the shaft 183 during reciprocable movement thereof with the frame 86 and the inertia propelling mechanism. Said drive member is journaled on a member 189, splined on the drive shaft 183, for driving said shaft.

The drive shaft 183 is journaled at its forward end in a bearing bracket 190 mounted on the forward end portion 170 of the frame 86. The driven member 187 has a flanged portion 193 having an arcuate rib 194 extending forwardly therefrom and partially around said flanged portion. The end of said rib is adapted to be engaged by an inwardly curved or hooked end of a torsion spring 195, for rotatably driving said spring upon rotation of said driven member. Said spring encircles the member 189 and is spaced therefrom, and the end of said spring opposite from the flanged portion 193 is inwardly curved and engages the end of an arcuate rib 196, extending inwardly of a flanged portion 197 of said member 189. Upon rotation of the driving member 173 the longitudinally extending shaft 183 will be driven through said driving member, the extensible drive connection including the S-shaped drive link 179 and driven member 187, and the torsion spring 195 and the member 189 splined on said shaft, in all positions of the frame 86 and reciprocating drive mechanism with respect to the turntable 12.

The longitudinal shaft 183 has a sleeve 199 splined on its rear end. Said sleeve is also splined on the forward end of a drive shaft 200 coaxial with said shaft 183. Said shaft serves to drive a vertical shaft 202 through a bevel gear reduction 203. A spur pinion 204 keyed on said vertical shaft, just beneath the cover, meshes with and drives the right-hand spur gear 88 and the two reciprocating drive mechanisms 87, 87.

The torsion spring 195 is of such proportions that it will accommodate the angular change in the parts that it drives over the entire range of the loads that have to be transmitted, without relieving the loads on the gearing driven by said spring. The range of said spring is also such that it is never below the driving speed of the shaft 183 for a period long enough to unwind or become free. Said spring also has a travel or angular range sufficient to bridge the peaks in the operating cycle in the reciprocating drive mechanisms 87, 87, and is so designed that its oscillating period is always different from the periods of reciprocation of said drive mechanisms or any multiples thereof. Said torsion spring with the flywheels 140, 140 thus serves to modify fluctuations in speed and load of the shaker conveyor drive mechanisms and prevents backlash in the driving gears for said drive mechanisms during the entire cycle of operation thereof.

A suitable fluid storage tank and pump (not shown) and suitable control valves and conduits 2,500,962

9 may be provided to control the supply and release of fluid under pressure to and from the stroke control cylinders 125, 125 for the inertia propelling device, to vary the impelling force thereof and control the direction of movement of the loading device; to and from the stroke control cylinder 79 for the shaker conveyor drive mechanism for the trough 15, to control the conveying effect of said trough; to and from the cylinder and piston 31, for elevating or lowering the shovel 14 about the axis of connection of the frame 16 to the upright supports 29, 29 and to the fluid motor 27 for turning the turntable. Said pump and control valves and fluid connections are not herein shown or described since they may be of any well known form and are no part of my present invention.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In combination, a drive mechanism particularly adapted to reciprocably drive a reciprocating member from a stationary motor, a base having said motor mounted thereon, gearing driven thereby, a reciprocating frame, gearing journaled therein and reciprocating drive mechanism driven thereby for reciprocably moving said reciprocating frame, and a yieldable and extensible drive connection from said gearing on said base to said gearing on said reciprocating frame serving to modify the effect of speed variations and load fluctuations upon said motor when reciprocably driving said reciprocating frame, said drive connection including an extensible member adapted to transmit rotary motion, said drive connection also including a torsion spring, connected to said extensible member, so loaded and proportioned that its slowest speed of oscillation is normally below the speed of said motor for a period of time insufficient in duration to allow said spring to become unloaded, and connected to rotatably drive said gearing on said reciprocating frame from said gearing on said base.

2. In combination, a drive mechanism particularly adapted to reciprocably drive a reciprocating member from a stationary motor, a base having said motor mounted thereon, gearing journaled in said base and driven by said motor, a reciprocating frame guided for reciprocable movement along said base, gearing journaled therein and reciprocating drive mechanism driven thereby for reciprocably moving said reciprocating frame along said base, and a yieldable and extensible drive connection from said gearing on said base to said gearing on said reciprocating frame serving to modify the effect of speed variations and load fluctuations on said motor when reciprocably driving said reciprocating frame and to take up backlash in said gearing on said frame and base, said drive connection including an extensible member connected to said gearing on said base and also including a torsion spring so loaded and proportioned that its period of oscillation is always different from the periods of oscillation of said reciprocating mechanism or any other multiples thereof, said spring being journaled in said frame and reciprocably

10 movable therewith and being operatively connected at its ends to said extensible member and said gearing on said frame to rotatably drive said gearing on said reciprocating frame from gearing on said base.

3. In combination, a drive mechanism particularly adapted to reciprocably drive a reciprocating member from a stationary motor, a base having said motor mounted thereon, gearing journaled in said base and driven by said motor, a reciprocating frame guided for reciprocable movement along said base, gearing journaled therein and reciprocating drive mechanism driven thereby for reciprocably moving said reciprocating frame along said base, and a yieldable and extensible drive connection from said gearing on said base to said gearing on said reciprocating frame serving to modify the effect of speed variations and load fluctuations on said motor when reciprocably driving said reciprocating frame and to take up backlash in said gearing on said frame and base, said drive connection including a torsion spring so loaded and proportioned that variations in the speeds of said reciprocating mechanism always stay below the equivalent no load speed of said motor, a shaft journaled in said reciprocating frame and forming a drive member for said gearing journaled in said frame, a drive connection from one end of said spring to said shaft for rotatably driving said shaft from said spring, and an extensible drive connection from said gearing on said base to the opposite end of said spring.

4. In combination, a drive mechanism particularly adapted to reciprocably drive a reciprocating member from a stationary motor, a base having said motor mounted thereon, gearing journaled in said base and driven by said motor, a reciprocating frame guided for reciprocable movement with respect to said base, gearing journaled therein, reciprocating linkage mechanism connected with said base and journaled in said frame and reciprocably driven by said gearing journaled in said frame for reciprocably moving said frame along said base, and an extensible and yieldable transmission means interposed between said gearing on said base and said gearing on said frame for reciprocably driving said linkage mechanism, said transmission means including a torsion spring operatively connected to said gearing on said frame and of such proportions that it will accommodate the velocity change in said reciprocating linkage mechanism over the entire range of the loads that have to be transmitted, whereby the effects of speed variations and load fluctuations developed by said reciprocating mechanism during operation thereof will be dampened by said spring.

5. In combination, a drive mechanism particularly adapted to reciprocably drive a reciprocating member from a stationary motor, a base having said motor mounted thereon, gearing journaled in said base and driven by said motor, a reciprocating frame guided for reciprocable movement with respect to said base, gearing journaled therein, reciprocating linkage mechanism connected with said base and journaled in said frame and reciprocably driven by said gearing journaled in said frame, for reciprocably moving said frame along said base, an extensible and yieldable transmission means interposed between said gearing on said base and said gearing on said frame for reciprocably driving said linkage mechanism from said motor including a torsion spring rotatably mounted in said frame and reciprocably movable therewith, an extensible drive connection from said gearing on said base to one end of said spring for rotatably driving said spring from said motor, and a drive connection from the other end of said spring to said gearing on said reciprocating frame for reciprocably driving said reciprocating linkage mechanism through said spring, said spring being of such proportions that it will accommodate the velocity changes in said reciprocating linkage mechanism over the entire range of the loads transmitted, without relieving the load on said drive gearing.

WILLIAM W. SLOANE.

REFERENCES CITED

The following references are of record in the file of this patent:

UNITED STATES PATENTS

| Number | Name | Date |
|---|---|---|
| 1,430,274 | Alger | Sept. 26, 1922 |
| 2,355,534 | Holstein | Aug. 8, 1944 |